INVENTOR.
BY HARRY B. BREEDLOVE

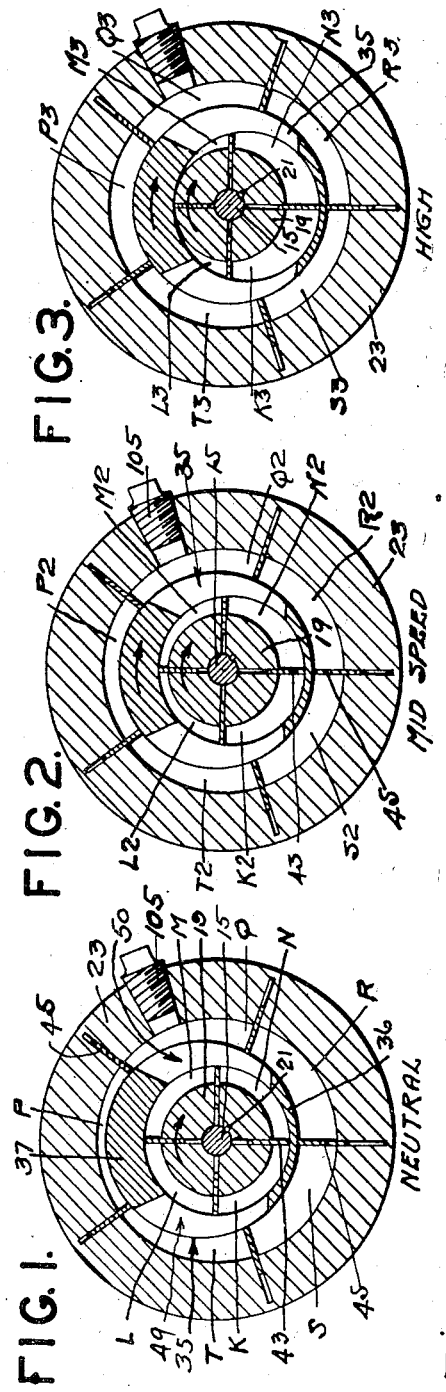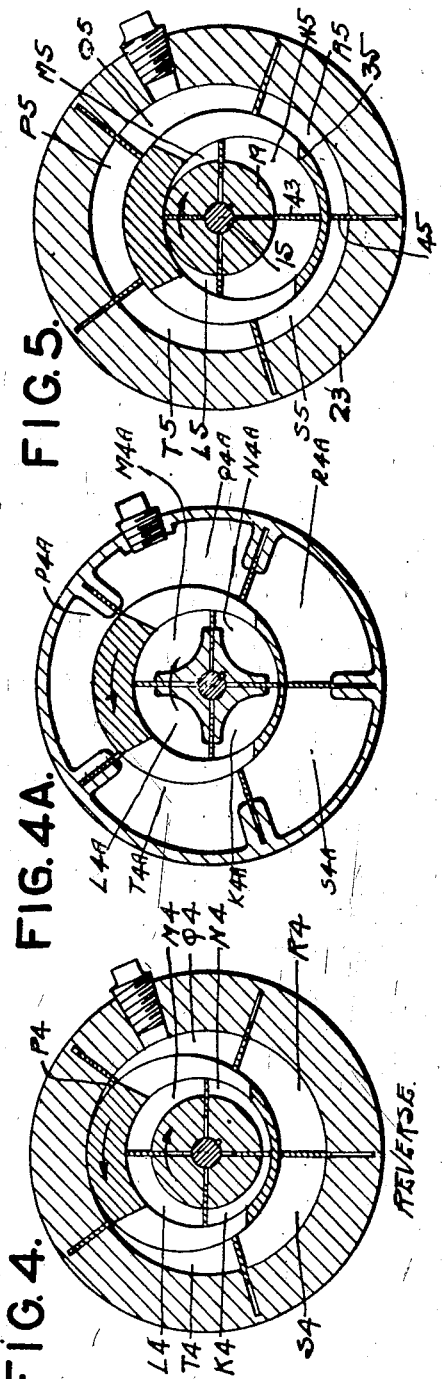

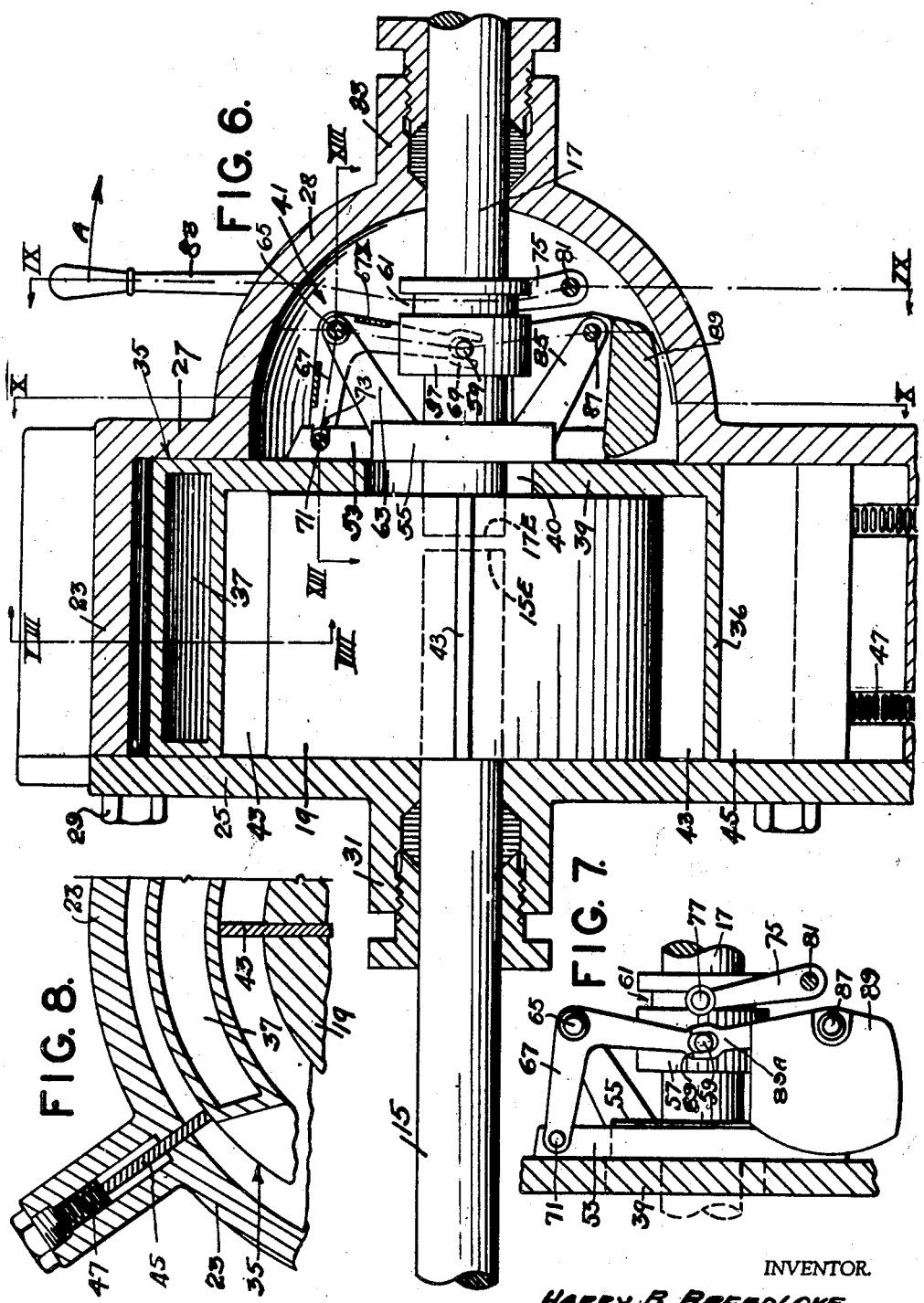

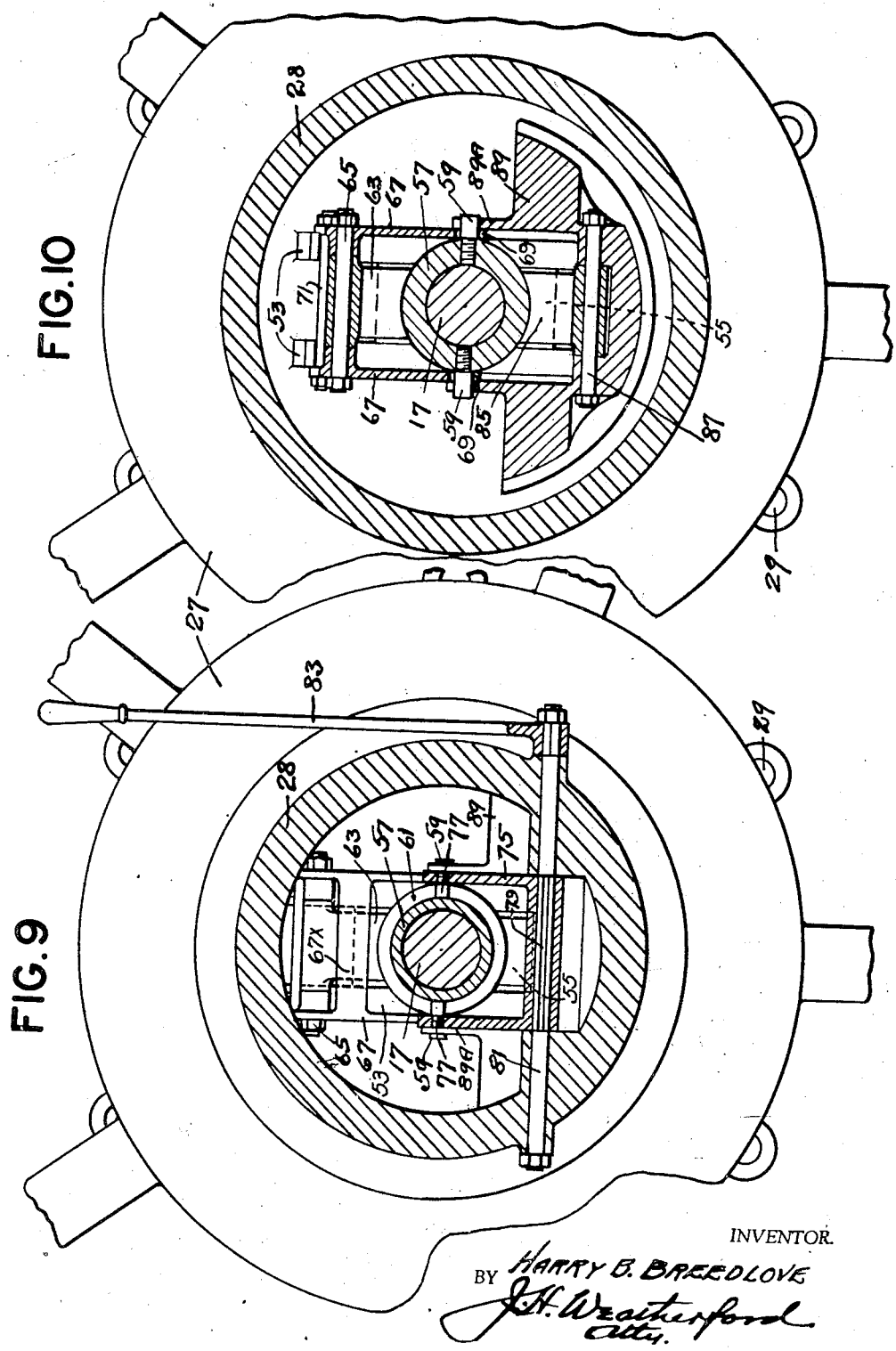

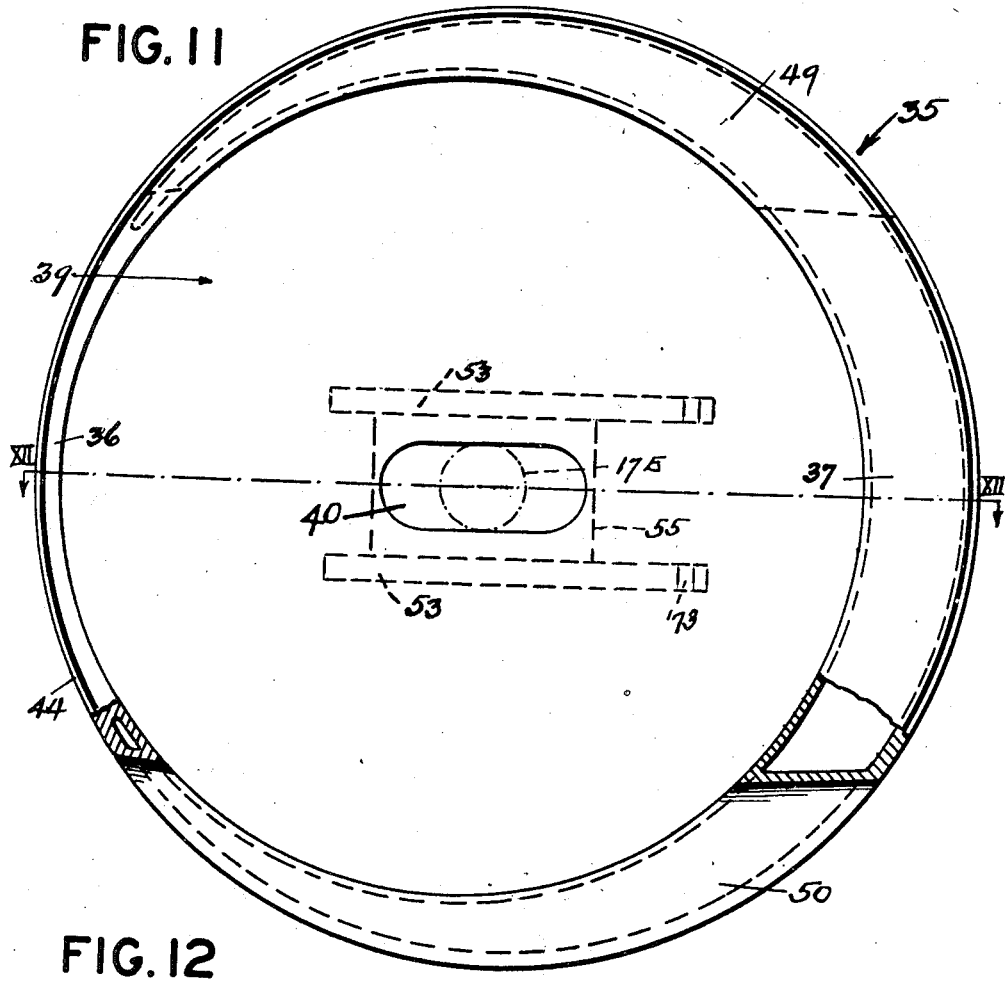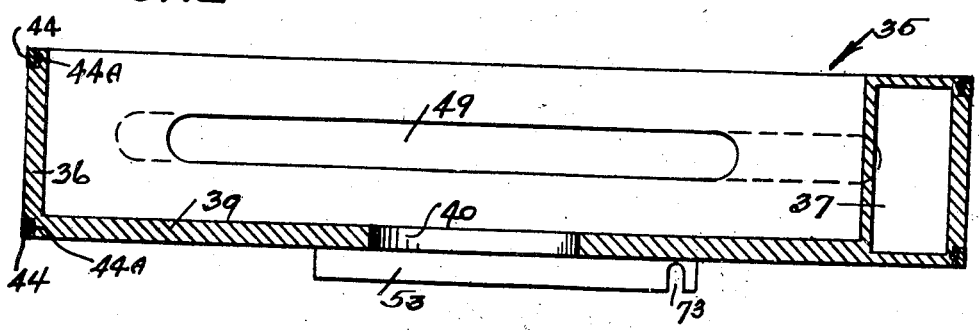

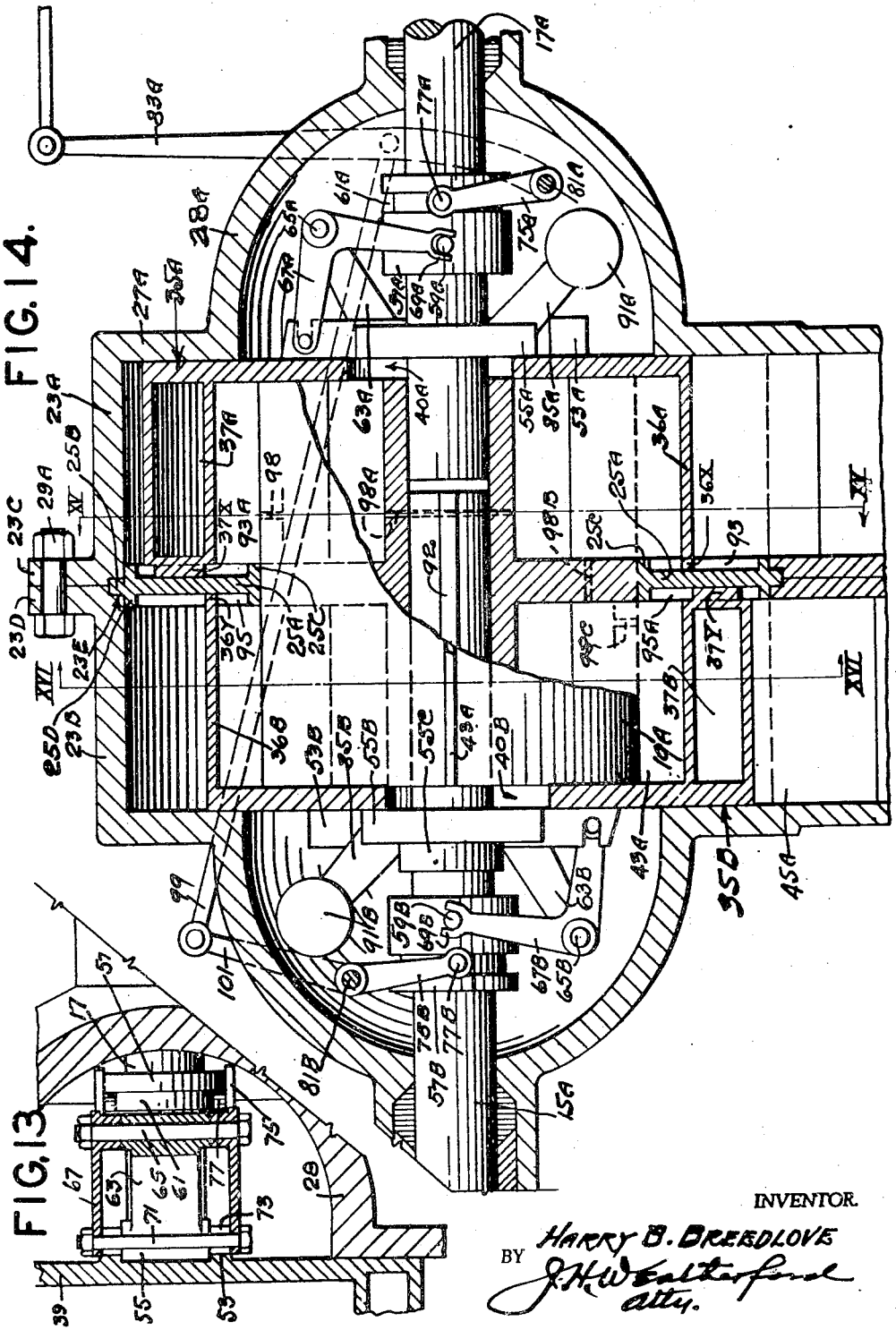

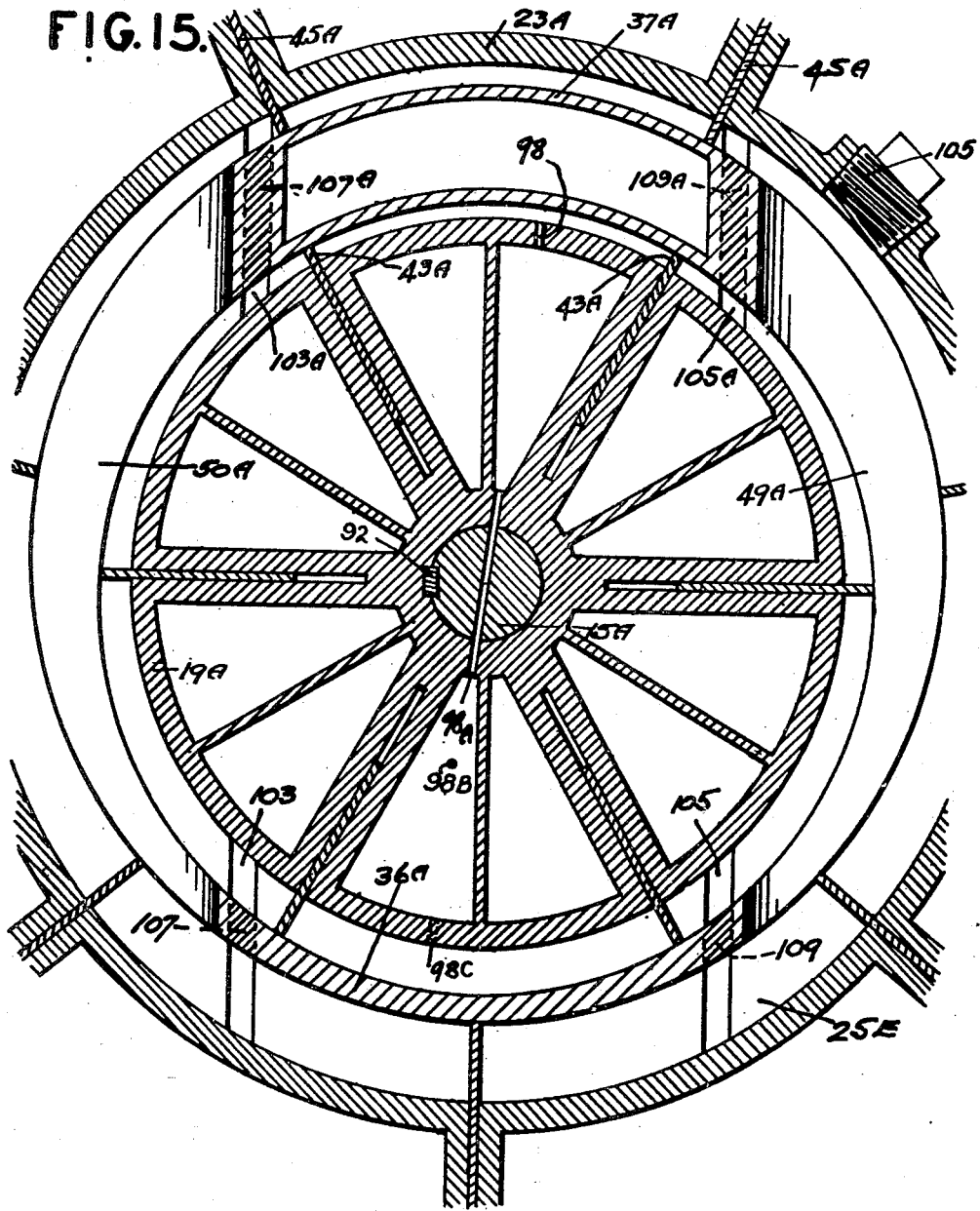

Patented Jan. 13, 1948

2,434,546

UNITED STATES PATENT OFFICE 2,434,546

VARIABLE-SPEED HYDRAULIC DRIVE

Harry B. Breedlove, Baton Rouge, La., assignor of one-half to J. H. Weatherford, Memphis, Tenn.

Application September 18, 1942, Serial No. 458,794

28 Claims. (Cl. 60—53)

This invention relates to means for transmitting power through the intervention of a liquid from one shaft to another at speed ratios manually variable, or reversible at will.

Primarily it is based on the principle of utilizing two pumps, one discharging fluid and the other acting as a motor to receive and utilize the discharge from the first pump as an energizing force, and varying inversely the capacities of the two pumps to effect the desired variations in speed ratio, the rotor of the first or energizing pump being driven by one shaft, and the rotor of the second or motor pump being mounted on the second shaft and transmitting its torque thereto.

The energizing pump preferably is of that well-known type in which a head is turned in an eccentric casing, the head carrying members or blades which move outward and inward as the head turns to maintain sliding contact with the eccentric casing, and the motor is a reverse form of this pump in which an eccentric rotor turns in a chamber concentric with the shaft of the rotor, the chamber carrying blades which ride in sliding contact with the rotor and move outwardly and inwardly to maintain such contact as the rotor turns.

The objects of the invention are:

To provide a transmission which will deliver power from a rotating drive shaft, either in the same or opposite directions of rotation, to a driven shaft initially at rest and in either case will build up the speed of the driven shaft smoothly and evenly by infinitesimal increments;

To provide a transmission which will accomplish such forward and reverse speed build-ups through an interposed fluid under pressure;

To provide a transmission which will accomplish such build-ups through direct liquid displacement without throttling;

To provide a transmission which will accomplish forward and reverse movements without intervention of gearing;

To provide a transmission in which speed ratios between driver and driven shaft may be changed by infinitesimal increments;

To provide means for counter-balancing a device of this character having an eccentric rotor;

To provide means for manually effecting shift of the parts to accomplish desired changes in speed ratio or direction.

The means by which the foregoing and other objects are accomplished and the manner of their accomplishment will readily be understood from the following specification on reference to the accompanying drawings, in which:

Figs. 1 to 5 inclusive are diagrammatic cross sections showing different positionings of the rotor and illustrating the underlying principles involved, Figs. 1 to 4A showing a shiftable driving head, a rotor shiftable in relation to the head and a casing concentric with the head, the parts being proportioned to limit the forward speed accomplished to that of the driving head and the reverse speed to about half such driving speed.

Fig. 5 discloses a similar cross section showing rotor and casing diameters increased relatively to driving head diameter to permit over-drive or greater speed than that of the driving shaft, and greater reverse range.

Fig. 1 shows the rotor so positioned that interiorly it is concentric with the driving head and in neutral position, rotation of the driving head effecting no displacement from the compartments around the driving head, and establishing no driving torque on the rotor, and additionally, the compartments surrounding the rotor being unable to discharge or take in liquid, the rotor is locked against creeping either forward or backward.

Fig. 2 shows the thicker side of the rotor shifted toward the driving head to a mid-position, establishing around such head compartments of unequal size, and causing the head-and-rotor couple to function as a pump, and the pump discharge to act on the rotor-and-casing couple to drive the rotor forward at a speed related to but less than the driving-head speed.

Fig. 3 shows the thicker side of the rotor further shifted into contact with the driving head, the parts being so proportioned that at such time the exterior of the rotor is concentric with the interior of the casing and pump displacement by the driving head-and-rotor couple cannot take place, the rotor thus necessarily moving as a unit with and at the speed of the driving head.

Fig. 4 shows the rotor reversely shifted from neutral, as related to Figs. 2 and 3, and away from the driving head until the thicker side of the rotor is in contact with the interior of the casing, effecting the limit of shift in reverse direction. In such shifted position, and all positions between neutral and such position, pump discharge acts on the rotor-and-casing couple to drive the rotor reversely at a speed related to, but less than the driving head speed.

Fig. 4A shows the parts positioned as in Fig. 4, but discloses that neither the body of the driving head need be cylindrical, nor the bore of the casing cylindrical.

Fig. 5 shows the rotor shifted, as in Fig. 3, until in contact with the driving head, the parts, however, being so proportioned that at such time the exterior of the rotor has passed concentricity with the interior of the casing, and pump displacement by the driving head rotor couple drives the rotor forward relatively to the driving head, at relatively increased speed.

Fig. 6 is a longitudinal sectional elevation, on a larger scale than the preceding figures, of one form of the device.

Fig. 7 is a fragmentary side elevation of the rotor shift mechanism and counter-weight, shown in sectional elevation in Fig. 6.

Fig. 8 is a fragmentary section taken as on the line VIII—VIII of Fig. 6, showing mounting and housing of one of the casing blades.

Fig. 9 is a sectional end elevation taken on the line IX—IX of Fig. 6.

Fig. 10 is a similar sectional end elevation taken as on the line X—X of Fig. 6.

Fig. 11 is an end elevation of a rotor, broken away in part to show slotting of the rotor, the rotor having been turned in this view ninety degrees from the position shown in the preceding figures.

Fig. 12 is a sectional elevation on the line XII—XII of Fig. 11.

Fig. 13 is a fragmentary sectional plan taken on the line XIII—XIII of Fig. 6.

Fig. 14 is a sectional elevation, corresponding to Fig. 6, showing a modified form of the device in which two oppositely shiftable rotors are employed to effect counterbalance.

Fig. 15 is a sectional elevation taken as on the line XV—XV of Fig. 14, with a dual key drive between the rotors and the annular diaphragm.

Figure 16:
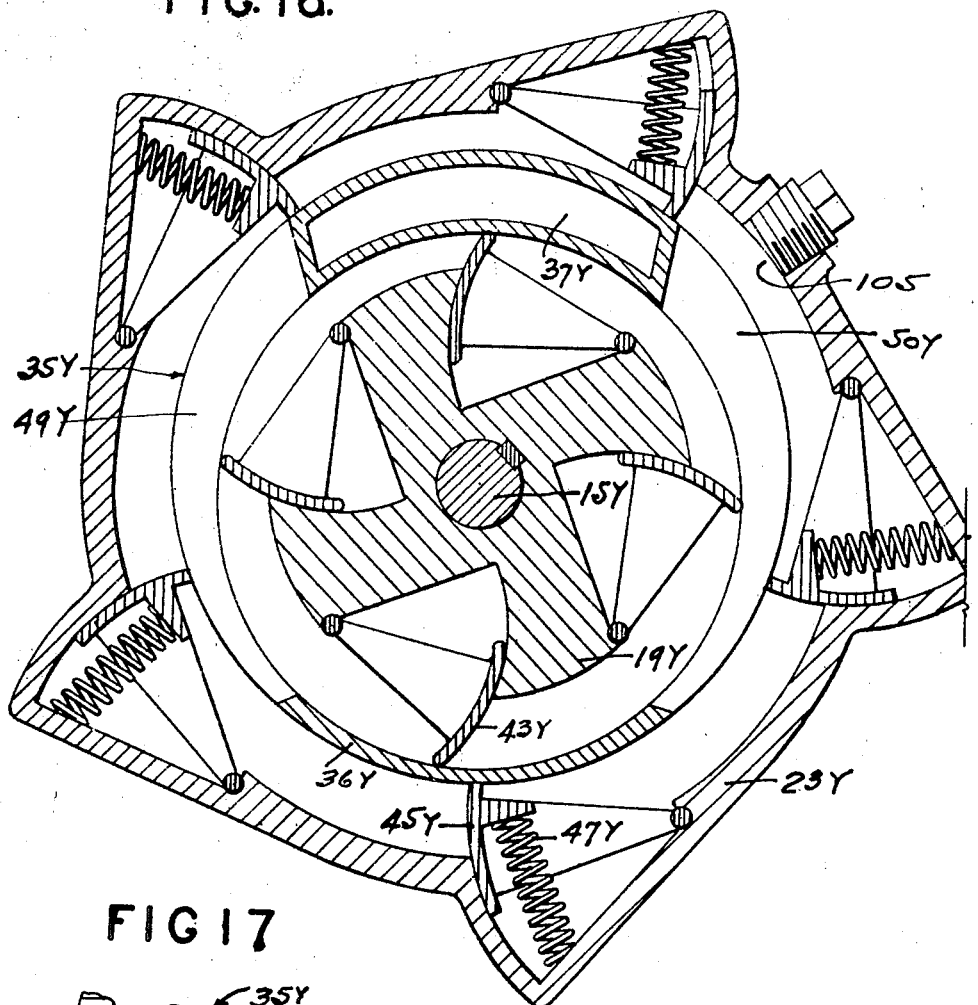

Fig. 16 is a sectional end elevation taken as on the line XVI—XVI of Fig. 14, showing a modified blade construction.

Figure 17:
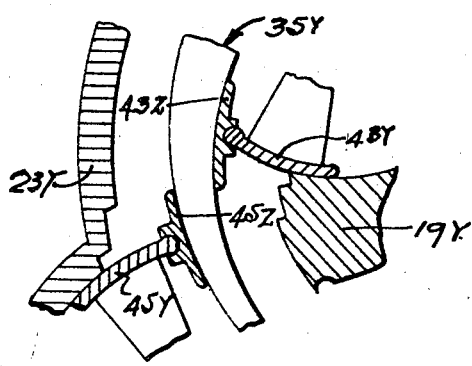

Fig. 17 is a fragmentary corresponding sectional view showing shoe equipped blades.

In all the views, except Figs. 16 and 17, it has been elected to show only forms of pump and motor which employ radially shiftable blades, though it will be understood that other forms of blades well known in the rotary pumping art, as the "bucket type" shown in Fig. 16, may be employed should it be so desired.

Referring now to the drawings in which the various parts are indicated by numerals:

15 is a driving shaft to which power is imparted in any usual or desired manner, and 17 a driven shaft to which drive torque is to be transmitted from the shaft 15, these two shafts being in axial alinement.

Mounted on the shaft 15 is a drum 19, hereinafter designated as a driving head, this drum being integral with or rigidly secured to the shaft 15 as by a key 21, Figs. 1 to 5.

The driving head 19 is disposed in an annular casing 23 preferably concentric with the shaft 15 and driving head, and having end walls 25, 27, one end of the driving head being in smooth rotary sliding contact with the wall 25. At least one of the walls, as the wall 25, is removable to permit assembly and is secured in place as by cap screws 29. The driving shaft 15 projects from the casing through the end wall 25, and is journalled in such end wall, and otherwise as may be desired, and the shaft 17 projects oppositely through the opposite wall 27 and is journalled therein and otherwise as desired. 31 is a stuffing box for the shaft 15, and 33 a stuffing box for the shaft 17. Preferably the shaft 15 terminates, as at 15E, short of the end of the head 19 and the shaft 17 extends as to 17E, into, and is journalled in and centered by the head.

Disposed in the casing around the driving head 19 is an annular rotor 35 which has its opposite ends in sliding contact with the heads 25 and 27. This rotor is exteriorly and interiorly cylindrical, the inner and outer surfaces being relatively eccentric, establishing a comparatively thin wall portion 36 on one side and a very much thicker diametrically opposite wall portion 37 on the opposite side, this latter wall portion being preferably hollow to reduce eccentric weight. This eccentric annular structure is closed at one end by a disc-like wall 39 which preferably forms a complete closure for that end of the rotor, unless the shaft 17 is extended as to 17E, Fig. 6, in which case it has a slotted opening 40 which closely embraces opposite sides of the shaft, but is elongated in the direction of the axial plane of greatest eccentricity of the rotor to permit shift of the rotor in that plane toward and away from the shaft. The inner surface of the wall 39 is flat and in sliding contact, both rotary and radial, with the outer end of the driving head 19, and its outer surface, also flat, is in sliding contact with the inner surface of the head 27.

Concentrically around the shaft 17, the casing wall 27 has an outwardly domed portion 28 forming a chamber 41 for shift mechanisms.

The driving head 19 is provided, in the usual manner of rotary pumps of this general type, with a plurality of blades 43 which extend from end to end of the head and slidably contact the end wall 25 of the casing, and the end wall 39 of the rotor, these blades being here shown as mounted to slide radially outward into engagement with the bore of the rotor 35 under action of centrifugal force due to rotation of the head. Similarly the casing 23 is provided with inwardly sliding blades 45, extending from end wall 25 to end wall 27 of the casing, these blades being here shown as radially disposed, and inwardly urged, Figs. 7 and 8, as by compression springs 47, into contact with the exterior cylindrical surface of the rotor 35. The number of casing-carried blades may be different from the number of drum-carried blades, as five blades in the casing and four blades in the head, such unequal numbers apparently promoting smoothness of action.

It will be understood that the head-carried blades 43 may be urged outward by springs similar to the springs 47 should it be desired or found necessary.

The rotor 35 is provided with openings connecting the bore and the casing. These openings may be of such shape as desired, but preferably are opposite circumferential slots 49, 50, there being necessarily one pair of such slots, and if the rotor be long, two or even more such pairs, only one pair, however, being shown. The slots establish communication for transfer of liquid from the interior to the exterior of the rotor and concurrent reverse supply flow from the exterior to the interior. They are symmetrically disposed on diametrically opposite sides of the diametral plane of greatest eccentricity of the rotor, this being the plane which passes through the center of the thickest and thinnest portions of the rotor shell. The thicker and thinner portions of the rotor between these slots are both imperforate, the circumferential span of the imperforate portions along the exterior of the rotor being sufficient to overlap adjacent pairs of the casing-carried blades 45, and the circumferential span interiorly sufficient to overlap adjacent pairs of the driving head blades 43. The rotor, as shown in Figs. 11 and 12, may have exteriorly a pair of circumferential rings 44 mounted on ball bearings 44A, on which rings the casing-carried blades seat, the rings shifting with the blades and reducing friction. It will be understood that ring projection beyond the circumferential face of the rotor is of the nature of one one-thousandth of an inch and will interfere little if at all with seal of the blades with the rotor face, particularly where a reasonably heavy oil is used.

Integral with the rotor wall 39, and extending into the chamber 41 are ribs 53 which are spaced equally outward from the diametral plane of greatest eccentricity of the rotor. The shaft 17 carries a T-head 55 which is slidably disposed between these ribs, constraining the shaft and rotor to rotate as a unit, and acting to transfer the rotor torque to the shaft 17.

Slidably disposed on the shaft 17 is a collar 57 which is preferably provided with diametrically oppositely extending pins 59 and an annular groove 61. Integral with the T-head 55 is a bracket arm 63 which carries a transversely disposed pin 65 on the opposite ends of which are mounted bell crank levers 67 which preferably are integrally connected, as by portions 67X. These bell crank levers have forks 69 which engage the pins 59 and their opposite legs carry a transverse pin 71 which engages slots 73 in the ribs 53, the mounting of the bell crank levers being effective to shift the rotor 35 radially with respect to the axis of the casing toward and from the driving head 19 on shift of the collar 57 along the shaft 17 away from or toward the rotor 35.

Disposed within the chamber 41 is a shift fork 75 which carries pins 77 oppositely engaging the groove 61 in the collar 57. This fork is mounted on and secured, as by a key 79, to a transverse shaft 81 which is suitably turnable in the wall 28 of the chamber 41 and which extends outward through such wall. At its outer end, the shaft 81 is preferably squared to engage the hub of a shift arm 83. By the above mechanism, shift of the arm 83, as manually, moves the collar 57 away from or toward the rotor, as the case may be, along the shaft 17 and effects related radial shift of the rotor 35 relatively toward or away from the driving head.

Extending from the diametrically opposite end of the T-head 55 is a second bracket 85 which carries a transversely disposed pin 87 on which is mounted a counter-balance weight 89, this counter-balance weight having opposite arm portions 89A spaced apart to embrace the bell crank lever arms 67 and engage with the pins 59 carried by the collar 57 so that movement of the collar shifts the counter-balance weight 89 radially in opposite direction to the shift of the rotor 35 and substantially maintains counter-balance of the rotor.

In Fig. 14, a modified form of the device is shown in which two rotors are employed, the rotors being disposed and their movements coordinated so that they shift in opposite radial directions. In this view the same numerals are used as before for identical parts with the letters "A" and "B" added to distinguish the two units. In this form of the device the shiftable counter-balance weights are not shown, though obviously they may be used if desired. If not used, fixed counter-weights 91A, 91B, carried by the bracket arms 85A, 85B are preferably used. 15A, 17A, are respectively the driving and driven shafts. Mounted on the shaft 15A is a driving head 19A, which is keyed to the shaft by a key 92. Preferably the shaft 17A extends into and is journalled in this head.

35A, 35B are the rotors which are of substantial identity with the rotors 35, except that each carries lugs or keys, the rotor 35A carrying keys 36X, 37X, and the rotor 35B keys 36Y, 37Y, extending beyond the facing ends of the rotors. These rotors are so disposed that the thick wall portion 37A of the one is on the diametrically opposite side of the shafts from the thick wall portion 37B of the other.

The casing is symmetrical about its longitudinal center line and comprises substantially identical halves 23A, 23B, provided with facing flanges 23C, 23D, secured together as by bolts 29A, each half being of substantial identity with the casing 23, except for the end wall 25.

The blade structure and action and the shift mechanism within the opposite shift chambers of the casing are also identical, except that the mechanism for shifting rotor 35B relative to rotor 35A, effects the shift in diametrically opposite directions. The brackets 63B, 85B, however, which respectively carry the bell crank arms 67B and the weight 91B, are carried by the T-head 55B which may include a hub portion 55C, and which is mounted to turn on the shaft 15A and is constrained to turn with the rotor 35B by the ribs 53B.

The casing is segregated longitudinally into identical working chambers by an annular rotatable diaphragm 25A, which is bored out to closely but rotatably fit the head and form an end closure for each of the two halves, and which corresponds in this respect to the end wall 25. The diaphragm peripherally has an annular rib 25B which extends beyond the bore of the chambers 23A, 23B into an annular groove 23E concentric with the shaft 15A, and preferably formed equally in the flanged ends of the two casing halves, the diaphragm being rotatably mounted in such groove.

The diaphragm 25A is provided with diametrically alined key-ways 93, 93A, facing the rotor 35A, and on its opposite face with similar key-ways 95, 95A, also in diametrical alinement, and in parallelism with the key-ways 93, 93A, these key-ways preferably terminating short of the bore and periphery of the diaphragm leaving key-way bridging surfaces 25C, 25D adjacent the head and casing against which the ends of the blades ride in passing the key-ways. The keys 36Y, 37Y of the rotor 35B are disposed along the diametral plane of greatest eccentricity of the rotor 35A and are respectively slidably disposed in the key-ways 95, 95A, of the diaphragm 25A constraining the diaphragm to turn with the rotor 35B. Similarly the keys 36X, 37X of the rotor 35A, slidably engage the key-ways 93, 93A of the diaphragm, coordinating turning movement of the rotor 35A with the diaphragm and the rotor 35B and enabling the rotor 35B, through the diaphragm and rotor 35A, to transmit its driving torque to the shaft 17A.

Pressure in the two halves of the rotor may be equalized by establishing leak ports from each compartment respectively of one pump chamber to the diagonally opposite compartment of the other pump chamber. In Fig. 14 and Fig. 15, openings 98, 98A, 98B and 98C are shown establishing a typical passageway through the driving head 19A from pump compartment of the chamber half 23A to the diagonally opposite pump chamber of the chamber half 23B, only one being shown since the passageway is typical.

Shift of the rotor 35A is accomplished as was shift of original rotor 35, by arm 83A exterior to the casing through shaft 81A and arms 75A, pins 77A, collar 57A and bell crank 67A. 99 is a link, coupling the arm 83A to a second arm 101. This latter arm is keyed or otherwise secured to a shaft 81B, which carries shift fork 75B, which, as before described, for corresponding parts, shifts collar 57B, bell crank 67B, and through ribs 53B, the rotor 35B. Movements of the two rotors 35A, 35B and their respective radially movable parts, are in opposite directions relatively to the shaft, and at all times maintains absolute rotational balance.

In Fig. 15, two sets of key-ways 103, 103A, 105, 105A in the annular diaphragm 25E have been substituted for the single pair of key-ways 93, 93A, these key-ways being spaced apart in excess of the distance apart of pairs of blades 43A, 45A in the head and casing respectively, and the rotor 35A is provided with complementary keys 107, 107A, 109, 109A, in lieu of the single pair of keys 36X, 37X, the sectioning of the keys, in Fig. 15, being made heavier than adjacent sectioning to emphasize them. Similar keys and key-ways are on the rotor 35B and opposite face of the diaphragm.

The use of the double set of keys obviates any possible chance that there might be momentary checking of pressure action when either a casing blade or a head-carried blade is passing a keyway.

In Fig. 16, parts heretofore described have been given the same numerals with the designating suffix "Y." Arcuately shiftable head and casing-carried blades 43Y and 45Y respectively, of what are known as "bucket type" have been substituted for the radial blades 43 and 45 before shown. The head 19Y has been modified to accommodate the changed blade construction and the casing 23Y similarly modified. No change is shown in the rotor 35Y from that originally shown. No change in the shift mechanism or other parts is here contemplated.

In Fig. 17, blades 43Z, 45Z respectively, which equipped with shoes 43Z, 45Z respectively, which shoes are mounted to rock on the blade edges and arcuately conform to the inner and outer surfaces of the rotor 35Y. Obviously similar shoes may be used with the radial blades 43 and 45 shown.

In making use of the invention, the driving shaft 15 is coupled to a suitable prime mover, or other source of power, and the shaft 17 to the mechanism to which power is to be delivered.

The entire space within the casing 23 exterior to the driving head 19 is filled with oil or other liquid of desired viscosity as through a suitable filling opening 105, it being necessary if a single filling opening is used to turn the driving head until all of the compartments are completely filled.

After filling, the lever 83, or 83A of the double rotor type, is shifted to bring the bore of the rotor 35 into concentricity with the driving head 19, Fig. 1, this centralized or neutral positioning, inherently establishing a spacing between the thicker portion 37 of the rotor and the interior of the casing relatively much more restricted than the spacing between the thin portion 36 of the rotor and the casing. With such positioning, the driving head turning in a concentric chamber will have no tendency to either push liquid from or take liquid into the equal size compartments K, L, M, N, and there is no transfer of liquid either to or from the unequal size compartments, P, Q, R, S, and T, around the exterior of the rotor, and not only will there be no torque transmitted from the driving head to the rotor to cause turning movement of the rotor and thereby turning movement of the coupled shaft 17, but the rotor will be locked against movement, since shift of liquid between the unequal size compartments and the compartments K, L, M, N, cannot occur.

With the driving head at speed, shift of the lever 83 to the right in the direction of the arrow A, Fig. 6, acting through the shaft 81, and fork 75, will shift the collar 57 away from the rotor 35. This shift, acting through the bell crank lever 65, moves the thicker part 37 of the rotor toward the driving head 19, as in Fig. 2, and away from the surrounding casing, and the thinner part 36 of the rotor away from the head toward the casing, it being noted that because of the engagement of the pin 77 of the fork 75 with the groove 61 of the collar 57, and regardless of what rotational position the rotor or driving head may have with regard to the arm 83, or the casing 23, the movement of the rotor with respect to the head and the casing will be the same.

This movement continued, eventually, as in Fig. 3, brings the exterior of the rotor concentric with the bore of the casing, in which position the compartments exterior to the rotor are of equal size and liquid cannot be forced thereinto from the rotor and the driven shaft must turn at the same speed as the driving shaft. Preferably the parts are so proportioned that at this time the bore of the rotor seats against the head 19 and further movement cannot occur.

It is possible, as shown in Fig. 5, to so proportion the parts that shift of the thicker side 37 of the rotor away from the casing bore is made past concentricity in which case, the driving head and rotor moving as a couple as over-shift begins, over-drive of the rotor is accomplished.

Also from the neutral position of Fig. 1, shift of the lever 83 oppositely to the arrow A, moves the thin side 36 of the rotor 35 toward the head 19, as in Fig. 4, and the heavy side 37 toward the casing, establishing a reversal of the action of the rotor discharge and accomplishing reversal of driving torque on the driving shaft.

In all the shift positions of the rotor 35, except direct speed, Fig. 3, the blades 43 of the head are changing position around the bore of the rotor, and in all positions, except neutral, Fig. 1, the rotor is changing position with regard to the blades 45 of the casing.

Action of the head-carried blades 43 in cooperation with the interior of the rotor, as most clearly shown in Fig. 2, with the head 19 turning clockwise, is to force liquid from compartments K2 and L2, decreasing in size, or waning, through port 49 and drawing liquid through port 50 into compartments M2 and N2 increasing in size, or waxing. Liquid is discharged into compartments S2 and T2, exerting its thrust on the rotor 35 to shift the rotor clockwise and permit such discharge. Concurrently waning compartments M2 and N2 drawing in liquid from compartments Q2 and R2 necessarily exert similar pull on the rotor to fill up the otherwise evacuated spaces.

Obviously there is no discharge from or flow into compartments K, L, M, and N, in the neutral position of Fig. 1, primarily because inflow cannot take place into the completely filled compartments M, and N. As diametral shift of the thicker side 37 of the rotor toward the head begins, however, infinitesimal increments of discharge and intake begin which very slowly turns the rotor 35, this discharge increasing in rate as pump eccentricity increases, and rotor eccentricity decreases, the rotor turning speed increasing toward driving speed until the exterior of the rotor becomes concentric, as in Fig. 3, at which time discharge from the driving head is blocked and the rotor must turn with it at driving speed.

In reverse shift, Fig. 4, M4 and N4 becomes the waning pump compartments, forcing the liquid through port 50 into waxing compartments Q4 and R4 and turning the rotor 35 counter-clockwise and reversely to the rotational direction of the driving head 19.

It is obvious that the rotor 35 is constantly turning, either in forward or reverse drive, with respect to the casing 23, so that the port 49, for example, establishing communication with compartments S2, T2, rapidly changes to T2, P2, then P2, Q2; Q2, R2; R2, S2, S2, T2, ad infinitum, but it will be noted that as these changes occur these compartments concurrently become waxing compartments and automatically promote the desired cycle.

It will be noted that in neutral, Fig. 1, the head 19 and its blades 43 with the trapped fluid content are the only moving part and except for friction of the blades on the then concentric bore of the rotor there is no resistance to turning movement of the head, and no radially shifting parts.

It will also be noted that in direct drive, Fig. 3, there are no radially shifting parts, the rotor turns in a static bath of liquid, and the only frictional resistance is the sliding friction of the smooth surfaces of the rotor.

The torque impressed on the rotor 35 is transferred from the rotor through the ribs 53 to the T-head 55 of the driven shaft 17. There is no shift of the ribs relatively to the T-head other than that manually made to effect change of speed ratio, and none arising from turning movement; at any intermediate speed ratio, and at direct speed, the rotor 35 and shaft 17 turn together as though rigidly secured.

The above description is applied to the single rotor type of Fig. 6, but it equally applies to the dual rotor type of Fig. 14. In such dual type the two rotors 35A, 35B are identically driven by the head 19A as is the rotor 35 just described by the head 19, rotation of the head 19A exerting substantially equal torque on both thereof. The rotor 35B transmits its torque through the keys 36Y, 37Y, (or the dual sets of keys 107, 107A; 109, 109A, of Fig. 15) to the diagram 25A, the diaphragm delivers its torque through the keys 36X, 37X to the rotor 35A, and the rotor 35A through the ribs 53A and T-head 55A delivers its own torque, and that transmitted to it from the rotor 35B to the driven shaft 17A. At any intermediate speed ratio, and at direct speed, the two rotors 35B, 35A, diaphragm 25A, and driven shaft 17A, turn as a rigid unit.

I claim:

1. A transmission device including a driving head and an axially alined driven shaft, an annular casing concentric with said head and shaft, enclosing and spaced from said head, to form an annular chamber therearound, an annular rotor, having an externally cylindrical shell of less diameter than said chamber and an eccentric cylindrical bore of greater diameter than said head, disposed in said chamber and around said head, opposite sectors of said shell spaced from the axial plane of greatest eccentricity of said shell being apertured to form intake and discharge ports, means carried by said head in sliding and sealing contact with the bore, of said rotor, adapted to cooperate with said shell to effect pumping inflow to, and discharge from, said shell, means carried by said casing in sliding and sealing contact with the outer surface of said shell, adapted to cooperate with said shell to utilize said inflow and discharge to effect motor drive on said shell, means for diametrically shifting said rotor along its axial plane of greatest eccentricity to vary eccentricity thereof relatively to said head and casing, and means for effecting driving coupling of said rotor to said driven shaft in all positions of rotor shift.

2. A transmission device including a driving head and an axially alined driven shaft, an annular casing concentric with said head and shaft, enclosing and spaced from said head, to form an annular chamber therearound, an annular rotor, having an externally cylindrical shell of less diameter than said chamber and an eccentric cylindrical bore of greater diameter than said head, disposed in said chamber and around said head, thinner and thicker opposite sectors of said shell being imperforate, and oppositely, between said sectors, said shell being apertured to form intake and discharge ports, means carried by said head in sliding and sealing contact with the bore of said rotor, adapted to cooperate with said shell to effect pumping inflow to, and discharge from, said shell, means carried by said casing in sliding and sealing contact with the outer surface of said shell, adapted to cooperate with said shell to utilize said inflow and discharge to effect motor drive on said shell, means for shifting said rotor along its axial plane of greatest eccentricity to vary eccentricity of said rotor relatively to said head and casing, and means for effecting driving coupling of said rotor to said driven shaft in all positions of rotor shift.

3. A transmission device including a driving head and an axially alined driven shaft, an annular casing concentric with said head and shaft, enclosing and spaced from said head to form an annular chamber therearound, an annular rotor, having an externally cylindrical shell of less diameter than said chamber and an eccentric cylindrical bore of greater diameter than said head, disposed in said chamber and around said head, oppositely between the thinner and thicker sectors, the sides of said shell being apertured to form intake and discharge ports, means carried by said head in sliding and sealing contact with the bore, of said rotor, adapted to cooperate with said shell to effect pumping inflow to, and discharge from, said shell, means carried by said casing in sliding and sealing contact with the outer surface of said shell, adapted to cooperate with said shell to utilize said inflow and discharge to effect motor drive on said shell, means for shifting said rotor along its axial plane of greatest eccentricity to vary eccentricity of said rotor relatively to said head and casing, means for effecting driving coupling of said rotor to said driven shaft in all positions of rotor shift, counter-balance means shiftably carried by said driven shaft, and means coupling said counter-balance means to said rotor shift means for accomplishing diametrically opposite shift of said counter-balance relatively to said rotor.

4. A transmission device including a driving shaft and an axially alined driven shaft, a driving head secured on said driving shaft, a casing including end walls and an annular shell concentric with said shafts, enclosing an end portion of said driven shaft, and enclosing and spaced radially from said head to form an annular chamber therearound, a radially shiftable rotor, disposed in said casing around said head, dividing said chamber progressively outward from said head into pump and motor chambers, said rotor including a disc end and an annular shell having a bore eccentric to its outer surface, said shell intermediate the thicker and thinner portions thereof, being oppositely apertured to establish ports communicating said pump and motor chambers, pump blades carried by said head effecting sealing contact with the bore and end of said rotor, and an end of said casing, motor blades carried by said casing effecting sealing contact with said casing end walls and the outer surface of said rotor shell, means, including rotor carried parts laterally shiftable with said rotor relatively to said driving shaft, effecting driving coupling between said rotor and said driven shaft; and means for shifting said rotor radially to vary eccentricity of said pump chamber and concurrently inversely vary eccentricity of said motor chamber.

5. A transmission device including a driving shaft and an axially alined driven shaft, a driving head secured on said driving shaft, a casing including end walls and an annular shell concentric with said shafts, enclosing an end portion of said driven shaft and enclosing and spaced radially from said head to form an annular chamber therearound, a radially shiftable rotor, disposed in said casing around said head dividing said chamber progressively outward from said head into pump and motor chambers, said rotor including a disc end and an annular shell having a bore eccentric to its outer surface, said shell being oppositely apertured between the thicker and thinner portions thereof to establish ports communicating said pump and motor chambers, pump blades carried by said head in sealing contact with the bore end of said rotor and an end of said casing, motor blades carried by said casing in sealing contact with said casing end walls and the outer surface of said rotor shell, means, including rotor carried parts laterally shiftable with said rotor relatively to said driving shaft, effecting driving coupling between said rotor and said driven shaft; a counter-weight carried by said driven shaft and laterally shiftable toward and away therefrom, and means for shifting said rotor radially to vary eccentricity of said pump chamber and concurrently inversely vary eccentricity of said motor chamber, and means coupled to said rotor shifting means for shifting said counter-weight in a laterally opposite direction to said rotor shift.

6. A hydraulic transmission, including a driving shaft and an axially alined driven shaft, a head secured on and rotated by said driving shaft, a casing disposed around said head, a cylindrical rotor having an eccentric bore disposed around said head and within said casing, segregating in said casing a pump and a radially outward motor chamber, means establishing passageways for fluid discharge and intake flow between said chambers, means coupling said rotor to said driven shaft for radial shift along the diametral plane of greatest eccentricity of said rotor, means carried by said head cooperating with the bore of said rotor to divide said pump chamber into a plurality of sectors, means carried by said casing cooperating with the exterior of said rotor to divide said motor chambers into a plurality of sectors, and manually operable means for shifting said rotor with respect to said driven shaft, and concurrently along said diametral plane with respect to said head and said casing, to vary inversely the eccentricities of said pump and motor chambers.

7. A hydraulic drive, including a driving shaft journalled in said casing, an annular casing, a head carried by said driving shaft and cooperating with said casing to establish an annular chamber, an annular rotor having a cylindrical exterior surface and an eccentric bore, rotatably disposed in said casing, said rotor cooperating with said casing to establish in said chamber, pump and motor compartments respectively adjacent said head and said casing, and being oppositely apertured to permit discharge flow from said pump compartment to said motor compartment and return flow from said motor compartment to said pump compartment, pumping blades carried by said head in cooperating relation with the walls of said pump compartment, motor blades carried by said casing in cooperating relation with the walls of said motor compartment, a driven shaft journalled in said casing, means, including means disposed along the diametral plane of greatest eccentricity of said rotor, effecting driving coupling of said rotor to said shaft, and means for shifting said rotor relatively to said head and casing, while maintaining driving coupling of said rotor to said driven shaft.

8. A hydraulic drive, including a driving shaft, a casing around and journalling said shaft, a head carried by said driving shaft, and cooperating with said casing to establish an annular chamber, an annular rotor having a cylindrical exterior surface and an eccentric bore, rotatably disposed in said casing, said rotor cooperating with said casing to establish in said chamber, pump and motor compartments respectively adjacent said head and said casing, and being oppositely apertured to permit discharge flow from said pump compartment to said motor compartment and return flow from said motor compartment to said pump compartment, pumping blades carried by said head in cooperating relation with the walls of said pump compartment, motor blades carried by said casing in cooperating relation with the walls of said motor compartment, a driven shaft alined with said motor shaft journalled in said casing, means disposed along the diametral plane of greatest eccentricity of said rotor effecting shiftable driving coupling of said rotor to said shaft, counter-balance means carried by said driving shaft, and diametrally opposed to the thickest portion of said rotor shell, and means for diametrally shifting said rotor to vary eccentricity of said rotor relatively to said head and casing, and for coordinately oppositely shifting said counter-balance means.

9. A hydraulic drive, including a casing, a driving shaft journalled in said casing, a head carried by said driving shaft and cooperating with said casing to establish an annular chamber, an annular rotor having a cylindrical exterior surface and an eccentric bore, rotatably disposed in said casing, said rotor cooperating with said casing to establish in said chamber, pump and motor compartments respectively adjacent said head and said casing, and being oppositely apertured to permit discharge and return flows between said pump and motor compartments, pumping blades carried by said head in cooperative sealing relation with the end walls of said pump compartment, means, which may be centrifugal force, urging said pumping blades into sealing contact with the bore of said rotor, motor blades carried by said casing in cooperative sealing relation with the end walls of said motor compartment, means urging said motor blades into sealing contact with the exterior surface of said rotor, a driven shaft journalled in said casing, means disposed along the diametral plane of greatest eccentricity of said rotor effecting shiftable driving coupling of said rotor to said driven shaft, and means for diametrally shifting said rotor to vary eccentricity of said rotor relatively to said head and casing.

10. A hydraulic drive, including an annular casing, a driving shaft journalled in said casing, a head carried by said driving shaft, and cooperating with said casing to establish an annular chamber, an annular rotor having a cylindrical exterior surface and an eccentric bore, rotatably disposed in said casing, said rotor cooperating with said casing to establish in said chamber, pump and motor compartments respectively adjacent said head and said casing, and being oppositely apertured to permit discharge flow from said pump compartment to said motor compartment and return flow from said motor compartment to said pump compartment, pumping blades carried by said head in cooperative sealing relation with the end walls of said pump compartment, means, which may be centrifugal force, urging said pumping blades into sealing contact with the bore wall of said rotor, motor blades carried by said casing in cooperative sealing relation with the end walls of said motor compartment, means urging said motor blades into sealing contact with the exterior surface of said rotor, a driven shaft journalled in said casing, means carried by said shaft, and relatively shiftable means carried by and disposed along the diametral plane of greatest eccentricity of said rotor effecting driving coupling of said rotor to said driven shaft, counter-balance means carried by said driven shaft, and diametrally opposed to the thickest portion of said rotor shell, and means for diametrally shifting said rotor to vary eccentricity of said rotor relatively to said head and casing, and for coordinately oppositely shifting said counterbalance means.

11. A hydraulic drive structure, including an annular casing having oppositely disposed end walls, a radially shiftable and rotatable rotor, disposed within said casing and having its opposite ends in sealing contact with said casing end walls, said rotor including an annular shell having a cylindrical bore, and a cylindrical outer surface eccentric to said bore, and a disc end at right angles to said bore and surface, a driving shaft concentric with said casing bore extending through and journalled in a first said end wall, a driving head secured on said shaft within said rotor bore and having its opposite ends in respective sealing contact with said first end wall and said rotor disc, the bore of said rotor being substantially greater than the diameter of said head, and the exterior of said rotor of substantially less diameter than said casing, said rotor establishing annular chambers respectviely between said head and rotor bore, and between said rotor and said casing bore, and having opposite ports through said shell intermediate the thicker and thinner portions thereof, establishing passageways between said chambers, blades having their opposite ends in respective sealing contact with said first end wall, and said disc end, said blades being mounted in said head for outward and inward movement in sealing contact with said rotor bore, means, which may be centrifugal force, for maintaining said blades in said bore contact; blades, having their opposite ends in respective sealing contact with said casing end walls, mounted in said annular casing wall for inward and outward movement in contact with said outer rotor surface, and means maintaining said blades in sealing contact with said surface; the second said end wall extending inward from said annular casing into overlapping relation with said rotor disc to effect said sealing contact therewith, and concentrically with said shaft, being offset longitudinally away from said disc to form a shift chamber, a driven shaft axially alined with said driving shaft, journalled in and extending through said offset end wall into substantially abutting relation with said rotor disc, diametrally shiftable means coupling said rotor and said driven shaft, and means for accomplishing diametral shift of said rotor relatively to said head and to said shaft.

12. A transmission device including a driving shaft and an axially alined driven shaft, a driving head secured on said driving shaft, a casing including end walls and an annular shell concentric with said shafts, enclosing an end portion of said driven shaft and enclosing and spaced radially from said head to form an annular chamber therearound, an annular division wall journalled on said head and in said annular shell separating said annular chamber into two longitudinal divisions and defining like divisions of said head, said annular wall having in its opposite faces key-ways in symmetrical parallelism with a single diametral plane of said wall, a pair of radially shiftable rotors disposed respectively in said longitudinal divisions of said chamber and around said head, each separating its said division progressively outward from said head, into pump and motor chambers; each said rotor including a disc end and an annular shell having a bore eccentric to its outer surface, each said shell being oppositely apertured between the thicker and thinner portions thereof to establish ports communicating said pump and motor chambers and carrying keys complementary to said key-ways, alined in parallelism with the respective diametral planes of greatest eccentricity of said shells, said shells being relatively positioned, with the heavier sides of said shells on diametrically opposite sides of said head, and coupled for power transmission and holding in such relative positioning by engagement of said keys with said key-ways; pump blades, in groups separated by said annular wall, carried by said head divisions in respective sealing contact with the bores and ends of said rotors and opposite sides of said annular wall, motor blades, in groups separated by said annular wall, carried by said casing in respective sealing contact with said casing end walls and opposite sides of said annular wall, and with the outer surfaces of said rotors; means, including rotor carried parts in parallelism with the diametral plane of greatest eccentricity of said rotor, radially shiftable with said rotor relatively to said driving shaft, effecting driving coupling between one said rotor and said driven shaft; and means for shifting said rotors radially in opposite directions to oppositely vary eccentricity of said pump chambers respectively and concurrently inversely vary eccentricity of said motor chambers respectively.

13. A hydraulic drive, including an annular casing, a driving shaft journalled in said casing, a head carried by said driving shaft, and cooperating with said casing to establish an annular chamber, means cooperating with said head and casing to separate said chamber longitudinally into two sections, a pair of substantially identical annular rotors, having cylindrical exterior surfaces and eccentric bores, rotatably disposed respectively in said casing sections with the heavier and lighter portions of the one diametrally inverted with respect to the other, each said rotor respectively cooperating with said casing and said separating means to establish in its respective said chamber section, pump and motor compartments respectively adjacent said head and said casing, and being oppositely apertured to permit discharge flow from its said pump compartment to its related said motor compartment, and return flow from said motor compartment to said pump compartment; parts carried by said rotors, respectively in parallelism with the diametral planes of greatest eccentricity of said rotors, slidably cooperating with said separating means to maintain said diametrally inverted relation and couple said rotors into a rotor unit; pumping blades in sets carried by said head in respective cooperating relation with walls of said pump compartments; motor blades in sets carried by said casing in respective cooperating relation with walls of said motor compartments; a driven shaft journalled in said casing, means slidably shiftable along the diametral plane of greatest eccentricity of said rotor unit, effecting driving coupling of said unit to said driven shaft, and means for diametrally shifting said rotors, in coordinated opposite directions, to vary eccentricity of said rotors relatively to said head and casing while maintaining driving coupling of said rotor unit to said driven shaft.

14. A hydraulic transmission, including a driving member and a driven member, a casing disposed around a first of said members, an annular rotor externally and internally cylindrical, disposed around said first member and within said casing, segregating in said casing an inner and a radially outer chamber, means establishing passageways for fluid discharge and intake flow between said chambers, means coupling said rotor to the second of said members, means carried by said first member cooperating with the bore of said rotor to divide said inner chamber into a plurality of sectors, means carried by said casing cooperating with the exterior of said rotor to divide said outer chamber into a plurality of sectors, and means for shifting said rotor with respect to said first member and said casing, to vary inversely the eccentricities of said chambers.

15. A hydraulic transmission, including a driving member and an axially alined driven member, a casing disposed around a first of said members, an annular rotor externally and internally cylindrical, disposed around said first member and within said casing, segregating in said casing an inner and a radially outer chamber, means establishing passageways for fluid discharge and intake flow between said chambers, means coupling said rotor to the second of said members; means carried by said first member cooperating with the bore of said rotor to divide said inner chamber into a plurality of sectors, means carried by said casing cooperating with the exterior of said rotor to divide said outer chamber into a plurality of sectors, counter-balance means carried by said second member, means for shifting said rotor with respect to said members and said casing, to vary inversely the eccentricities of said chambers, and complementary means for oppositely shifting said counter-balance means.

16. A hydraulic transmission, including a driving member and a driven member, a casing disposed around a first of said members, an annular rotor externally and internally cylindrical disposed around said first member and within said casing, segregating in said casing an inner and a radially outer chamber, oppositely disposed ports through said rotor wall establishing passageways for fluid discharge and intake flow between said chambers, means shiftably coupling said rotor to the second said member for maintaining driving connection therewith, means carried by said first member cooperating with the bore of said rotor to divide said inner chamber into a plurality of sectors, means carried by said casing cooperating with the exterior of said rotor to divide said outer chamber into a plurality of sectors, and means for shifting said rotor from concentricity with said first member into eccentricity therewith in either opposite direction.

17. A transmission device, including a driving member and an axially alined driven member, a casing, including end walls and a shell, spaced radially from a first of said members to form a chamber therearound, a rotor disposed in said casing and around said first member, said rotor comprising annular shells internally and externally cylindrical, dividing said chamber into inner and outer compartments, and wall means interposed between said shells slidably coupling said shells together, for shift in parallel diametral direction, and dividing said compartments longitudinally into sections, means establishing communication between the inner and outer compartments of said sections each respectively, means carried by said first member dividing said inner compartment sections each respectively, into a plurality of sectors, means carried by said casing dividing said outer compartments sections each respectively, into a plurality of sectors, means effecting shiftable coupling of said rotor to the second of said members, and means for shifting said shells in equal and diametrically opposite directions, while maintaining said coupling to said second member.

18. A transmission device, including axially alined driving and driven members, a casing enclosing and spaced radially from said driving member to form a chamber therearound, a rotor disposed in said casing and around said driving member, said rotor including annular shells internally and externally cylindrical, and means for slidably coupling said shells together and for dividing said chamber longitudinally into sections, said shells dividing said sections respectively into inner and outer compartments, means establishing communication between respective inner and outer said compartments of each section, means carried by said driving member, dividing said inner compartments each respectively into a plurality of sectors, means carried by said casing dividing said outer compartments respectively into a plurality of sectors, means effecting shiftable coupling of said rotor to said driven member, means for shifting said shells in equal and diametrically opposite directions, while maintaining said coupling to said driven member.

19. A hydraulic transmission, including a driving member and a driven member, a casing disposed around a first of said members, annular rotors externally and internally cylindrical disposed within said casing in end-on relation around said first member and in diametrically opposed counter-balancing relation, means disposed between adjacent rotors dividing said casing longitudinally into compartments, said rotors segregating said compartments each respectively into an inner and a radially outer section, means establishing passageways for fluid discharge and intake flow between the said sections of each compartment respectively, means shiftably coupling adjacent ones of said rotors in driving relation together and to the second of said members, for diametral shift in parallelism, means carried by said first member cooperating with the bores of said rotors to divide the inner said compartment sections each respectively into a plurality of sectors, means carried by said casing cooperating with the exterior of said rotors to divide the outer of said compartment sections each respectively into a plurality of sectors, and means for shifting adjacent ones of said rotors equally and oppositely, the one with respect to the other, and with respect to said first member and said casing, to vary inversely the eccentricities of said inner and outer sections, and promote rotational balance.

20. A hydraulic transmission, including a driving member and an axially alined driven member, a casing disposed around said driving member, a pair of substantially identical annular rotors externally and internally cylindrical, disposed within said casing in end-on relation around said first member and in diametrically opposite counter-balancing relation, means disposed between adjacent rotors dividing said casing longitudinally into compartments, said rotors segregating said compartments each respectively into an inner and a radially outer section, means establishing passageways for fluid discharge and intake flow between the said sections of each compartment respectively, means shiftably coupling said rotors in driving relation together, and to the second of said members, for diametral shift in parallelism, means carried by said first member cooperating with the bores of said rotors to divide the inner said compartment sections each respectively into a plurality of sectors, means carried by said casing cooperating with the exterior of said rotors to divide the outer of said compartment sections each respectively into a plurality of sectors, and means for shifting said rotors oppositely, the one with respect to the other, and with respect to said driving member and said casing, to vary inversely the eccentricities of said inner and outer sections, and promote rotational balance, said rotors being disposed in diametrically opposite symmetrical relation.

21. A variable speed hydraulic drive, including a drum having outwardly urged movable blades, a surrounding casing having inwardly urged movable blades, an annular rotor internally and externally cylindrical interposed between said drum and casing to establish pump and motor sections, said rotor cooperating with said blades and being radially shiftable with respect to said drum and casing, means establishing passageways between said sections, and means for shifting said rotor.

22. A variable speed hydraulic drive, including a pump and a responsively coupled motor, said pump and said motor each including a liquid containing casing, said pump casing including a cylindrically bored and externally cylindrical, radially shiftable, and rotatable wall member, forming the rotor of said motor, and a drum surrounded by said wall member, said drum having movable blades outwardly urged into contact with the bore of said wall member, said motor including a shell surrounding said wall member, and having movable blades inwardly urged into contact with the exterior surface of said wall member, means establishing passageways between said pump and motor casings, and means for shifting said wall member at option diametrically from concentricity with said drum into opposite positions of eccentricity therewith.

23. A fluid power transmission, comprising a rotary pump and a rotary motor having axially alined shafts, said pump including a shaft driven assembly and said motor including a shaft surrounding reaction assembly, said pump and motor including a rotary member in common cooperating as a reaction member with said pump assembly, and as a driven member with said motor reaction assembly, said rotary member being radially shiftable with respect to said shafts and coupled in driving relation to said motor shaft, and means for shifting said rotary member to vary inversely said pump and motor capacities.

24. A hydraulic drive comprising a variable capacity pump including a rotor, and a variable capacity motor, including a reaction housing, which said pump and motor include a radially shiftable rotary member in common, which is the reaction housing of said pump and the rotor of said motor.

25. In a fluid drive, a variable capacity pump including a rotor, and a variable capacity, rotary motor including a reaction housing, said pump and motor including a radially shiftable rotatable member enclosing said pump rotor and cooperating as a reaction member therewith, and which said member is housed by, and cooperates as a rotor with said motor housing.

26. A fluid power transmission comprising variable capacity rotary pumps and variable capacity rotary motors, said pumps including a driven member and radially shiftable rotatable members housing and cooperating as reaction members therewith, said motors including reaction housings, said pump reaction members forming the rotors of said motors, and being mounted in and cooperating with said motor housings.

27. A fluid power transmission comprising a variable capacity pump including a driven assembly and a variable capacity motor, including a reaction housing assembly, said pump and motor including a laterally shiftable rotary member in common, housing and cooperating as a reaction member with said driven assembly of said pump, and housed by and cooperating as a driven member with said reaction housing assembly of said motor.

28. A fluid power transmission comprising a variable capacity pump including driven pumping means, and a variable capacity motor including reaction means; said pump and motor including a laterally shiftable rotary member in common, housing and cooperating as a reaction member with said driven pumping means, and housed by, and cooperating as a driven member with said motor reaction means.

HARRY B. BREEDLOVE.

(References on following page)

REFERENCES CITED

The following references are of record in the file of this patent:

UNITED STATES PATENTS

| Number | Name | Date |
|---|---|---|
| 466,662 | Duncan | Jan. 5, 1892 |
| 1,497,741 | Schneider | June 17, 1924 |
| 1,604,321 | Schneider | Oct. 26, 1926 |
| 1,779,757 | Streckert | Oct. 28, 1930 |
| 2,159,941 | Guinness | May 23, 1939 |

FOREIGN PATENTS

| Number | Country | Date |
|---|---|---|
| 148,876 | Great Britain | Sept. 1, 1921 |
| 221,749 | Great Britain | Sept. 18, 1924 |
| 477,028 | Great Britain | Dec. 20, 1937 |
| 361,221 | Germany | Oct. 12, 1922 |
| 624,254 | Germany | Jan. 20, 1936 |